April 15, 1941.  C. M. FIELDS  2,238,443
APPARATUS FOR POLYMERIZATION
Filed Sept. 6, 1939
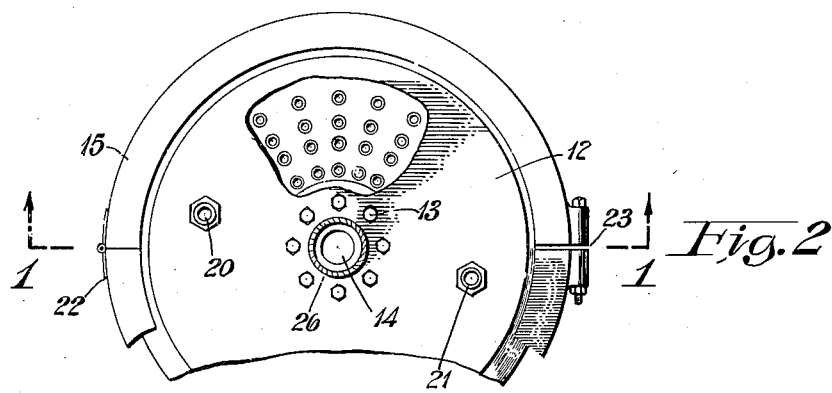
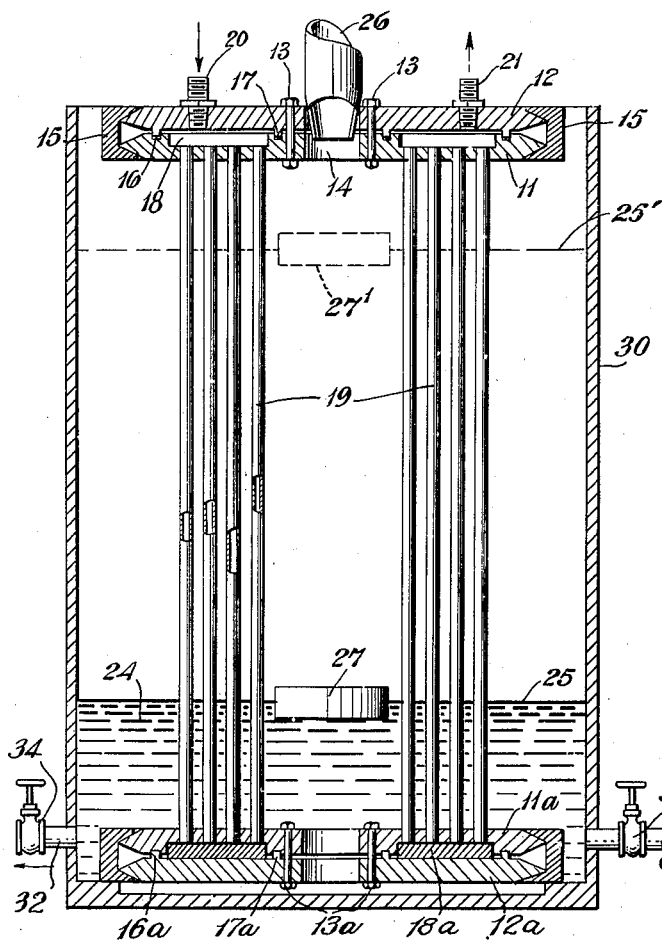
Fig.1
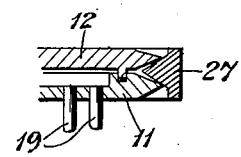
Fig.5
Fig.4
Fig.3
Charles M. Fields  INVENTOR
BY
*J. M. Castle Jr.*
ATTORNEY

Patented Apr. 15, 1941

2,238,443

UNITED STATES PATENT OFFICE 2,238,443

APPARATUS FOR POLYMERIZATION

Charles M. Fields, Arlington, N. J., assignor to E. I. du Pont de Nemours & Company, Wilmington, Del., a corporation of Delaware Application September 6, 1939, Serial No. 293,533

6 Claims. (Cl. 18—26)

This invention relates to an apparatus for the polymerization of organic compounds and, more particularly, for the polymerization of polymerizable liquids in elongated shapes at elevated temperatures.

In applicant's United States Patent 2,057,674, entitled "Polymerization process," is described a method for the polymerization of liquid compositions comprising monomeric polymerizable organic compounds such as methyl methacrylate in elongated molds at elevated temperatures. This method comprises introducing a substantial volume of the liquid composition into an elongated mold closed at one end, applying heat to a narrow zone at the closed end of the mold until the monomeric compound in that zone is substantially polymerized, and progressively advancing the heating zone along the axis of the mold at about the rate at which the monomeric compound in the mold is being polymerized, while maintaining the liquid composition ahead of the advancing heating zone at a temperature below that at which the monomeric compound will undergo active polymerization.

Preferably, in order to permit of relatively rapid progress of this polymerization but at the same time to avoid the development of bubbles, the contents of the mold are kept under hydrostatic pressure. Conveniently this is done by maintaining a connection between the contents of the mold and a source of the polymerizable liquid and inserting between them a suitable pump adapted to maintain the desired pressure upon the liquid in the mold. Such a pump is that described in copending application of C. M. Fields and R. T. Fields, Serial No. 188,466, filed February 3, 1938. It serves not only to maintain the desired hydrostatic pressure upon the contents of the mold, but also to feed into the mold additional liquid to compensate for the shrinkage in volume which the polymerizable liquid undergoes during polymerization.

Essential to the success of the process described in said United States Patent 2,057,674 is the limitation of the polymerization to a narrow zone at any given time and, to this end, the maintenance of the polymerizable liquid in advance of this zone at a temperature sufficiently low so that polymerization will not begin prematurely therein. It is necessary to combat two influences tending to initiate premature polymerization, namely, the conduction of heat by the material of the mold itself, which is ordinarily of metal, and the transfer of heat vertically upward, chiefly by convection currents, within the polymerizable liquid. The latter can be minimized by partially polymerizing the liquid, up to the condition of a viscous syrup, before introducing it into the mold.

The prevention of premature heating of the contents of the mold is made more difficult when, in commercial practice, a plurality of molds is used instead of a single mold. It has come to be standard commercial practice to construct multiple molds comprising a plurality of mold tubes attached to and communicating with a header, and it is of course desirable, in order to save space, to place the individual mold tubes rather close together, e. g., within two or three diameters between centers. As a result of this construction, effective cooling by radiation is not obtained as in the case of a single mold and there is a strong tendency for polymerization to get out of control in those tubes which are surrounded by other tubes and therefore unable effectively to lose their heat by radiation. Cooling by jacketing is impracticable because a jacket would complicate the design of the mold assembly and interfere with its mechanical operation.

It is an object of the present invention to provide a new and improved apparatus for the polymerization of organic compounds in elongated shapes by the method mentioned. A specific object is to provide for the cooling of the mold tubes of a multiple assembly in a zone in advance of the zone in which, at a given time, polymerization is being effected, and thereby to make possible the control of the progress of polymerization within all of the tubes of a multiple assembly regardless of their positions within the group. A further object is the accomplishment of this important result by simple, inexpensive, and reliably automatic means. A further object is the design and construction of multiple molds of improved convenience and practicability for commercial use. Other objects will be apparent from the description of the invention given hereinafter.

The above objects are accomplished according to the present invention by polymerizing a polymerizable organic liquid in an apparatus comprising a plurality of elongated mold tubes vertically disposed, a bath of heated liquid, means for progressively immersing said mold tubes in said bath, and means for directing a current of gas in a horizontal zone directly above the surface of said bath.

Preferably, the mold tubes are grouped about a central space and communicate at their upper ends with a common chamber formed between a header plate and a cover plate, which chamber, in turn, communicates with a source of polymerizable liquid under pressure. Further, it is preferred that the means for directing a current of gas in a horizontal zone directly above the surface of the bath should comprise a blast of air directed vertically downward through an opening in the header and cover plates and through the central space within the group of mold tubes upon a deflector plate which floats on the surface of the bath and serves to deflect the blast of air into a radial horizontal distribution. Since the deflector is automatically always at the same level with respect to the surface of the bath, so also is the zone of distribution of the horizontal air current maintained always at the desired level.

Preferred means of closing and opening the mold assembly comprise a clamping ring and a parting ring.

Specific embodiments of the invention are described hereinafter with reference to the accompanying drawing, wherein:

Fig. 1 is a vertical section of a mold assembly according to a preferred embodiment of the present invention;

Fig. 2 is a plan view of the top of the mold assembly shown in Fig. 1;

Figs. 3 and 4 represent alternative forms of one element of the apparatus; and

Fig. 5 represents a device adapted to a preferred method of opening the mold assembly upon the completion of the polymerization.

Referring to Figs. 1 and 2, the header plate 11 and the cover plate 12 are of annular shape and are adapted to be held together by bolts 13, 13 around the periphery of the central opening 14 and by a clamping ring 15 around their outer periphery. At 16 and 17, annular projections on the lower face of the cover plate 12 rest upon gaskets in corresponding annular grooves in the header plate 11 to form liquid- and gastight seals. Within the space between these seals at 16 and 17, the upper face of the header plate 11 has cut in it a wide annular groove 18. A plurality of tubular molds 19, 19 are mounted in holes drilled through the header plate 11 in this area. The upper ends of these tubes 19, 19 are preferably flush with the floor of the groove 18. The mold tubes 19, 19 are thus intercommunicating through the annular space or chamber between the floor of the groove 18 and the lower face of the cover plate 12, and are adapted to be filled by the introduction of liquid into the latter. For this purpose there is provided a filling port 20 penetrating the cover plate 12 at a convenient point in this area. There is provided also a second port 21 which serves as an air vent during the filling of the molds with liquid.

The lower ends of the molds 19, 19 may be closed in various ways. Since the polymerization of material in the annular space 18 unites at the top all of the rods of polymer formed in the tubes 19, 19, the bottom of these tubes 19, 19 must be individually sealed to permit the withdrawal of the group of rods from the equipment. Preferably, however, the bottoms of the mold tubes 19, 19 are not permanently closed since that would prevent the application of a thrust from the bottom to eject the rods from the top of the multiple mold.

One method of individually closing the bottoms of the mold tubes 19, 19 is illustrated in Fig. 1 and involves mounting the bottoms of these tubes in a header plate 11A identical with header plate 11. Against this plate is fastened a cover plate 12A, identical with cover plate 12, except that the ports can be omitted. The rabbetted joints at 16A and 17A are not provided with gaskets, as are their counterparts at 16 and 17 but an annular gasket is provided to fill the space at 18A and thus, when the plates 11A and 12A are drawn up together, to seal tightly the bottom end of each of the mold tubes 19, 19.

The use of a lower header plate 11A of the same design and dimensions as the upper header plate 11 makes the top and bottom of the assembly interchangeable.

The clamping ring 15 is of C-shaped cross-section, with tapered faces corresponding to tapers cut at the periphery of the upper face of the cover plate 12 and at the periphery of the lower face of the header plate 11. The clamping ring is hinged at 22 and its free ends adapted to be bolted together at 23. Drawing up on the bolt at 23 reduces the diameter of the clamping ring and thereby draws the header plate 11 and cover plate 12 together against the gasket at 16. A similar clamping ring may be used with the plates at the bottom of the mold assembly.

The mold assembly thus described is adapted for use in the manufacture of rods of polymer of, e. g., methyl methacrylate, by the method of United States Patent 2,057,674. The multiple mold is connected, through the filling port 20, with a reservoir of methyl methacrylate which has previously been partially polymerized, up to the condition of a viscous syrup, and the mold is filled with this syrup, conveniently through the operation of an intervening pump. The air vent 21 is left open until the mold becomes full.

Polymerization is now effected, beginning at the bottom of the molds, by immersing the bottom of the mold assembly in a heated liquid 24, conveniently water, so as to initiate and maintain polymerization in a narrow zone. As shown in Fig. 1, the heated liquid 24 is held in a vessel 30 fitted, adjacent its bottom, with inlet connection 31 and outlet connection 32 which are provided with valves 33 and 34, respectively. By closing valve 34 and opening valve 33 a suitable amount, the level of the heating liquid 24 in the vessel 30 may be gradually raised and, hence, if the mold assembly is held in fixed position, the depth of the assembly in the heating liquid 24 may be gradually increased. As polymerization proceeds, the zone of activity is gradually moved up the length of the tube molds 19, 19 by gradually increasing the depth of their immersion in the heating liquid 24, this rate of immersion being commensurate with the rate at which polymerization is effected. Shrinkage in volume resulting from the polymerization is compensated by the downward flow of liquid from above the zone in which polymerization is proceeding, and the mold is kept full of liquid at all times by suitable additions through the filling port 20. Preferably, the mold is kept filled with liquid and kept under hydrostatic pressure by the operation of an automatic pump installed between the reservoir of polymerizable liquid and the filling port 20.

The progressive immersion of the molds into the heated liquid may be accomplished by progressively lowering the mold assembly into the liquid or as indicated above, by holding the mold stationary and progressively raising the level of the liquid. The manner of accomplishing immersion by either of these methods will be obvious to those skilled in the art. The first method requires mechanical means of lowering the mold assembly at an operative rate but presents the advantage that the free surface 25 of the liquid can be maintained at or near the top of the vessel in which it is contained and that thus the cooling of the molds is not hampered by the walls of the vessel. The second method does involve such obstruction which, however, is not troublesome if the diameter of the vessel is sufficiently greater than the diameter of the mold assembly, and this method is mechanically more easily followed since it involves merely the introduction of heating liquid into the vessel at a rate which will effect progressive immersion at the desired operative rate.

In accordance with the present invention, the confinement of active polymerization to a narrow zone approximately at the level of the surface 25 of the heating liquid 24 is effected by directing a substantially horizontal current of cold air or other gas upon the mold tubes 19, 19 just above this level. This can be accomplished in various ways.

If the method of immersion is that of lowering the mold assembly into the heating liquid and if the level of the latter is kept at or near the top of the vessel in which it is contained, the horizontal current of air can be directed across the surface of the liquid, so as to pass among the mold tubes by means of one or more fans or ducts suitably located outside the mold assembly.

If the method of immersion is that of raising the liquid level with respect to a stationary mold assembly, then the cooling of the mold necessitates provision of a horizontal current of air at a level which is initially deep in the containing vessel and which must be progressively changed so as to be kept just in advance of the rising level of the liquid.

A pipe or duct terminating in a suitable nozzle or distributor can be carried down through the open space within the group of mold tubes, so as to provide radial horizontal currents of air just above the liquid level. Such a device is fitted with means of progressively raising it in conformity with the change in liquid level. Obviously its nozzle must not be permitted to become submerged in the liquid as that would cause an agitation of the liquid by the air discharged into it and destroy the level surface required for the process of polymerization.

Preferably and more simply, the production of a horizontal current of air just above the surface of the liquid is effected by means illustrated in Fig. 1. A blast of cold air is directed down the axis of the mold assembly by means of an air duct 26 inserted in the upper header plate 11 and cover plate 12, and is deflected into an approximately horizontal distribution, radially from the axis of the mold assembly and just above the level of the surface 25 of the heating liquid 24, by means of a deflector plate 27 which floats upon the surface 25 and substantially fills the circular area inside the bank of mold tubes 19, 19. By this means, a positive cooling effect is applied to all of the mold tubes 19, 19 at a level at which such cooling is most effective in preventing the premature advance of heat vertically upward in the mold tubes and contents, by conduction and convection, and thus in preventing such broadening of the narrow zone of polymerization as would cause failure of the process of polymerization by preventing the access of still liquid material into the zone of polymerization to compensate for shrinkage therein.

It is obvious that the use of a deflector plate 27 to divert the vertical blast of air into horizontal radial distribution insures at all stages of the process, i. e., at all levels of the liquid surface 25, that the cooling effect will be applied at the level at which it is needed, namely just above the surface 25 of the heating liquid 24. The floating deflector has also the further function of preventing agitation of the heating liquid 24 by the air blast. This function becomes increasingly important as the distance between the liquid level 25 and the top of the mold assembly is diminished by the gradual immersion of the latter. With the liquid level in the relative position 25', obviously the force of the air blast is less diminished by dissipation before it impinges upon the deflector float at 27', and in the absence of the plate the air blast would churn up the heating liquid so that it would have no fixed surface and thus make impossible the maintaining of the necessary narrow zone of polymerization in the tubes.

In Fig. 1 the deflector plate 27 is indicated as a solid block of cylindrical or disk shape and this form it may take if made of a material, such as wood, which will float upon water. It will be apparent, however, that such a plate made in a single piece could not be inserted into its operating space through the opening in either the bottom or the top plates of the mold assembly and would have to be dropped into place before the mold tubes 19, 19 are fastened into the header plate. Alternatively, the plate may be made up in two or more pieces, small enough to be inserted through the central hole 14, which are then bolted or otherwise fastened together. Such a construction is indicated in Fig. 3.

If desired, the upper surface of the deflector plate may be configured to promote deflection of the air blast more nearly completely into the desired horizontal radial distribution. A float so shaped is shown in Fig. 4.

The floating plate may be made of any other suitable material, such as sheet metal, if properly designed to float. It should have sufficient mass so that it will not be driven beneath the water by the force of the air blast and its horizontal area should occupy substantially all of the open space within the bank of mold tubes but with enough clearance to ensure that it floats freely at all levels of the heating liquid 24. Its height should be small in proportion to its diameter in order that it may be effective when at its lowest position, at the beginning of the operation, when it may be supported slightly above the surface of the heating liquid by contact with the lower header plate 11A.

When polymerization has been completed, in accordance with the process disclosed in United States Patent 2,057,674, all of the mold tubes 19, 19 are filled with polymer, as is also the annular space 18. The mold assembly is now immersed in cold water for a sufficient time to chill the polymer, which, by reason of its greater coefficient of contraction, becomes sufficiently loose within the mold so that it may be withdrawn therefrom. To accomplish this, after removal of the equipment from the chilling water, disconnecting the filling port 20 from the source of polymerizable liquid, and opening the air vent 21, the bolts 13, 13 and 13A, 13A are released, the clamping rings 15 and 15A removed, and the header plates and cover plates separated from each other at both the bottom and the top of the mold assembly. At the bottom, this separation is effected without effort but, at the top, the header plate 11 and the cover plate 12 may tend to be held together after removal of the clamping ring 15 by a slight adhesive action of the polymer. The separation of the plates 11 and 12 is desirably accomplished by the use of a parting ring of which a section is shown at 27 in Fig. 5. This is a ring made in two parts provided with a hinge and a bolt in manner analogous to that of the clamping ring 15 already described, but is wedge-shaped in cross-section. This wedge is adapted to be inserted between tapered faces cut at the peripheries of the lower surface of the cover plate 12 and the upper surface of the header plate 11. Tightening of a bolt analogous to that at 23 in Fig. 2 thrusts the wedge section of the ring 27 between the plates 11 and 12 and separates them.

The entire mass of polymer can now be removed from the mold assembly by a thrust from the bottom. Conveniently this thrust is obtained by the use of plugs described in United States Patent 2,136,425 of the present applicant.

The present invention provides a simple, economical, and reliably automatic means of controlling the polymerization of liquid compositions in elongated molds by the method of United States Patent 2,057,674 in that it provides, in connection with commercial multiple molds comprising a large number of mold tubes, a reliable means of effecting limitation of active polymerization to a narrow zone as is essential to the successful operation of the process of the patent.

As many apparently widely different embodiments of this invention may be made without departing from the spirit and scope thereof, it is to be understood that the invention is not limited to the specific embodiments thereof except as defined in the appended claims.

I claim:

1. Apparatus for the polymerization of organic compounds in elongated shapes, comprising a plurality of elongated mold tubes vertically disposed about a central space, a bath of heated liquid, means for progressively immersing said mold tubes in said bath, means for directing a current of gas vertically down said central space, and a deflector plate floating on the surface of said bath within said central space whereby said current of gas is deflected.

2. Apparatus for the polymerization of organic compounds in elongated shapes, comprising an annular header plate provided with an annular groove in the upper surface thereof and a plurality of holes in the grooved portion thereof, an annular cover plate positioned on the upper surface of said annular header plate thereby forming an annular chamber, said cover plate being provided with an inlet communicating with said annular chamber, a clamping ring holding said plates together, a plurality of elongated tubes vertically disposed with their upper ends mounted in said holes in said header plate, means closing the lower ends of said tubes, a bath of heated liquid, means for progressively immersing said tubes in said bath, and means for directing a current of gas in a horizontal zone immediately above the surface of said bath.

3. Apparatus for the polymerization of organic compounds in elongated shapes, comprising an annular header plate provided with an annular groove in the upper surface thereof and a plurality of holes in the grooved portion thereof, an annular cover plate positioned on the upper surface of said annular header plate thereby forming an annular chamber, said cover plate being provided with an inlet communicating with said annular chamber, a clamping ring holding said plates together, a plurality of elongated tubes vertically disposed with their upper ends mounted in said holes in said header plate, means closing the lower ends of said tubes, a bath of heated liquid, means for progressively immersing said tubes in said bath, means for directing a current of gas vertically down the central space delineated by said tubes, and a deflector plate floating on the surface of said bath within said central space whereby said current of gas is deflected.

4. Apparatus for the polymerization of organic compounds in elongated shapes, comprising an annular header plate provided with an annular groove in the upper surface thereof and a plurality of holes in the grooved portion thereof, an annular cover plate positioned on the upper surface of said annular header plate thereby forming an annular chamber, said cover plate being provided with an inlet, the lower surface of said annular header plate being tapered adjacent the periphery thereof upwardly and the upper surface of said annular cover plate being tapered adjacent the periphery thereof downwardly, a clamping ring of C-shape cross-section encircling said plates and bearing against said tapered surfaces thereof to hold said plates tightly together, a plurality of elongated tubes vertically disposed with their upper ends mounted in said holes in said header plate, means closing the lower ends of said tubes, a bath of heated liquid, means for progressively immersing said tubes in said bath, means for directing a current of gas vertically down the central space delineated by said tubes, and a deflector plate floating on the surface of said bath within said central space whereby said current of gas is deflected.

5. Apparatus for the polymerization of organic compounds in elongated shapes, comprising an annular header plate provided with an annular groove in the upper surface thereof and a plurality of holes in the grooved portion thereof, an annular cover place positioned on the upper surface of said annular header plate thereby forming an annular chamber, said cover plate being provided with an inlet communicating with said annular chamber, means holding said plates together, a plurality of elongated tubes vertically disposed with their upper ends mounted in said holes in said header plate, means closing the lower ends of said tubes, a bath of heated liquid, means for progressively immersing said tubes in said bath, and means for directing a current of gas in a horizontal zone immediately above the surface of said bath.

6. Apparatus for the polymerization of organic compounds in elongated shapes, comprising an annular header plate provided with an annular groove in the upper surface thereof and a plurality of holes in the grooved portion thereof, an annular cover plate positioned on the upper surface of said annular header plate thereby forming an annular chamber, said cover plate being provided with an inlet, the lower surface of said annular header plate being tapered adjacent the periphery thereof upwardly and the upper surface of said annular cover plate being tapered adjacent the periphery thereof downwardly, a clamping ring of C-shape cross-section encircling said plates and bearing against said tapered surfaces thereof to hold said plates tightly together, a plurality of elongated tubes vertically disposed with their upper ends mounted in said holes in said header plate, means closing the lower ends of said tubes, a bath of heated liquid, means for progressively immersing said tubes in said bath, and means for directing a current of gas in a horizontal zone immediately above the surface of said bath.

CHARLES M. FIELDS.